United States Patent
Pfeiffer et al.

(10) Patent No.: US 11,453,223 B2
(45) Date of Patent: Sep. 27, 2022

(54) METHOD FOR INLINE OPAQUE WHITE CONTROL IN PRINTING MACHINES

(71) Applicant: HEIDELBERGER DRUCKMASCHINEN AG, Heidelberg (DE)

(72) Inventors: Nikolaus Pfeiffer, Heidelberg (DE); Joerg Schmitt, Seeheim-Jugenheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 17/205,185

(22) Filed: Mar. 18, 2021

(65) Prior Publication Data
US 2021/0291550 A1      Sep. 23, 2021

(30) Foreign Application Priority Data
Mar. 19, 2020   (DE) .................... 10 2020 107 553.7

(51) Int. Cl.
*H04N 1/60* (2006.01)
*B41J 2/21* (2006.01)

(52) U.S. Cl.
CPC .......... *B41J 2/2117* (2013.01); *B41J 2/2132* (2013.01); *H04N 1/605* (2013.01); *H04N 1/6022* (2013.01); *H04N 1/6038* (2013.01)

(58) Field of Classification Search
CPC ... B41J 2/2117; H04N 1/6022; H04N 1/6038; H04N 1/605; G06K 15/023
See application file for complete search history.

(56) References Cited

U.S. PATENT DOCUMENTS

| | | | |
|---|---|---|---|
| 5,224,421 A * | 7/1993 | Doherty | B41F 33/0045 101/DIG. 45 |
| 8,154,761 B2 * | 4/2012 | Huber | B41F 33/0027 358/1.9 |

(Continued)

FOREIGN PATENT DOCUMENTS

| | | | | |
|---|---|---|---|---|
| DE | 10020648 A1 * | 10/2001 | | B41F 7/06 |
| DE | 102007005018 A1 * | 8/2007 | | B41F 33/0027 |

(Continued)

*Primary Examiner* — Ted W Barnes
(74) *Attorney, Agent, or Firm* — Laurence A. Greenberg; Werner H. Stemer; Ralph E. Locher

(57) ABSTRACT

A method for closed-loop color control in printing machines using a computer includes initially coating a printing substrate with opaque white to set up closed-loop color control in the course of a print job, subsequently applying process colors and, in the process, color measurement strips onto the opaque white, recording the opaque white and the color measurement strips using a measuring device, and, based on data recorded by the measuring device, performing closed-loop color control for process colors and opaque white using the computer. The measuring device is an inline measuring device and is initially calibrated at a fixed position of the printing substrate, then the application of opaque white is adjusted and, when a deviation stays below a maximum deviation, closed-loop control of both the opaque white and the process colors is done using the computer by taking measurements in the color control strip.

9 Claims, 2 Drawing Sheets

(56) References Cited

U.S. PATENT DOCUMENTS

| | | | |
|---|---|---|---|
| 8,887,637 B2* | 11/2014 | Huber | B41F 33/0036 |
| | | | 101/485 |
| 9,346,259 B2* | 5/2016 | Michels | B41F 33/0045 |
| 9,365,026 B2* | 6/2016 | Mueller | B41F 7/025 |
| 9,741,132 B2 | 8/2017 | Krabbenhoeft | |
| 2007/0157840 A1* | 7/2007 | Mayer | B41F 33/0045 |
| | | | 101/484 |
| 2007/0201065 A1* | 8/2007 | Huber | B41F 33/0027 |
| | | | 358/1.9 |
| 2008/0236430 A1* | 10/2008 | Elter | B41F 33/0045 |
| | | | 101/484 |
| 2013/0215440 A1* | 8/2013 | Chandermohan | G06K 15/021 |
| | | | 358/1.9 |
| 2015/0053102 A1* | 2/2015 | Mueller | H04N 1/605 |
| | | | 101/450.1 |
| 2015/0090136 A1* | 4/2015 | Rancourt | B41F 33/0063 |
| | | | 101/142 |
| 2016/0284101 A1* | 9/2016 | Krabbenhoeft | G06T 7/0008 |
| 2019/0202197 A1* | 7/2019 | Singer | B41F 33/02 |
| 2021/0162734 A1* | 6/2021 | Flemming | B41F 33/0027 |

FOREIGN PATENT DOCUMENTS

| | | | | |
|---|---|---|---|---|
| DE | 102007005018 A1 | | 8/2007 | |
| DE | 102006009383 A1 | * | 9/2007 | B41F 33/0045 |
| DE | 102006009383 A1 | | 9/2007 | |
| DE | 102007011344 A1 | * | 10/2007 | B41F 33/0036 |
| DE | 102013017055 A1 | * | 5/2014 | B41N 1/00 |
| DE | 102013017055 A1 | | 5/2014 | |
| DE | 102014011151 A1 | * | 2/2015 | B41F 33/0036 |
| DE | 102014011151 A1 | | 2/2015 | |
| DE | 102015205275 B3 | | 3/2016 | |
| DE | 102018121299 A1 | * | 3/2020 | |
| DE | 102018121299 A1 | | 3/2020 | |
| DE | 102009007864 B4 | * | 7/2021 | B41F 33/0036 |
| WO | WO-2007099554 A2 | * | 9/2007 | A61K 35/747 |

* cited by examiner

METHOD FOR INLINE OPAQUE WHITE CONTROL IN PRINTING MACHINES

CROSS-REFERENCE TO RELATED APPLICATION

This application claims the priority, under 35 U.S.C. § 119, of German Patent Application DE 10 2020 107 553.7, filed Mar. 19, 2020; the prior application is herewith incorporated by reference in its entirety.

BACKGROUND OF THE INVENTION

Field of the Invention

The present invention relates to a method for closed-loop control of opaque white using inline measurement devices on transparent foils or materials vapor-coated with aluminum.

The technical field of the invention is the field of color control in printing machines.

As compared to color control for the actual process colors, special requirements apply to color control for opaque white, i.e. a white primer onto which the actual process colors are to be applied. For that purpose, most known methods use an external color measurement device with its inherent disadvantages. Therefore, it would be desirable to find a way of using inline color measurement devices, which are present in many printing machines and usually rely on color control strips, for the closed-loop control of opaque white. Due to the special requirements for controlling opaque white, the known methods of inline color management using print control strips cannot simply be applied to closed-loop opaque white control. Printing with opaque white in multiple printing units requires special treatment of the print control strip, for instance by reserving the fields in the respective other opaque white units. Moreover, when opaque white is applied in multiple printing units, it is not the total color impression that is controlled. Instead, individual target color locations of the individual opaque white printing units need to be determined.

A specific prior art example is closed-loop opaque white control using an automated closed-loop color control unit external to the machine such as ImageControl by Heidelberger Druckmaschinen AG, which controls an entire print sheet in terms of the attained printed colors including opaque white. In this context, "entire" is understood to mean that the entire print sheet is analyzed and not just the color control strips. For light opaque colors, among them opaque white, that process works with a reversal of the algebraic sign. However, that approach cannot be used for inline controlling because for an in-press process, the measurement bar needs to be calibrated on paper. Moreover, in multicolor printing, the individual target values need to be determined in advance, i.e. there is only closed-loop production printing control, no set-up phase. Moreover, in multicolor printing, there is no simple way of specifying the ratio of the ink applications and no factoring in of the adjustment direction. Yet, that is necessary for opaque colors in particular at the saturation point.

Thus, the goal would be a simple, fully automatic process for in-line closed-loop opaque white and color control, which provides the option of printing opaque white in more than one printing unit and includes closed-loop control of the genuine target value, namely the color impression of the composite opaque white. Also needed are a simple way of inputting the allocation of printing units for multicolor printing and, depending on specifications, an automated target value determination for the individual printing units, an automated adjustment of closed-loop color control, and an adaptation of the control parameters to the particularities of opaque colors.

BRIEF SUMMARY OF THE INVENTION

It is accordingly an object of the invention to provide a method for closed-loop color control in printing machines, which overcomes the hereinafore-mentioned disadvantages of the heretofore-known methods of this general type in terms of inline opaque white control in a printing machine.

With the foregoing and other objects in view there is provided, in accordance with the invention, a method for closed-loop color control in printing machines by using a computer, the method comprising the steps of initially coating a printing substrate with opaque white to set up closed-loop color control in the course of a print job, subsequently applying process colors and, in the process, color measurement strips onto the opaque white, recording the opaque white and the color measurement strips by using a measuring device, and, based on the data recorded by the measuring device, performing closed-loop color control for process colors and opaque white by using the computer, wherein the measuring device is an inline measuring device and is initially calibrated at a fixed position of the printing substrate, then the application of opaque white is set up and, when a deviation stays below a maximum deviation, closed-loop control of both the opaque white and of the process colors is implemented using the computer by taking measurements in the color control strip.

This approach circumvents the problems of the prior art such as reserving fields for the respective other opaque white units in the print control strip by calibrating the measuring device at a fixed position of the printing substrate. The actual closed-loop color control for the process colors is not started until the opaque white control has been successfully set up in such a way that the attained opaque white value is close enough to the opaque white target value for any deviations to stay below a defined maximum deviation. From this point on, opaque white control and process color control run in parallel. The inline measuring device which is used in this process is usually the image recording system which includes special sensor/cameras and is present in many printing machines.

Advantageous and thus preferred further developments of the method will become apparent from the associated dependent claims and from the description together with the associated drawings.

Another preferred development of the method of the invention in this context is that the fixed position is a position immediately next to the color measurement strip. Since during closed-loop color control, the inline measuring device is logically focused on the color control/measurement strip, it is expedient to use a position close to the color measurement strip for the fixed position for the calibration of the inline measuring device to opaque white in order to ensure that when the color measurement strip is recorded, the position for opaque white calibration is likewise available to the inline measuring device.

A further preferred development of the method of the invention in this context is that the inline measuring device is a spectral measuring head which measures both opaque white and the measurement strips in Lab values. Since the inline measuring device takes spectrophotometric measurements, the use of Lab values for an analysis in particular for opaque white control is expedient. The inline image recording system uses a spectral measuring head as the measuring device to make the aforementioned spectrophotometric inline measurement possible.

An added preferred development of the method of the invention in this context is that a correction measurement is taken at a fixed position for the calibration of the inline measuring device and the spectra are saved for later calculations. This ensures calibration to the printing substrate Lab value later to attain the target opaque white value.

An additional preferred development of the method of the invention in this context is that if there are multiple printing units for the application of opaque white, the application of opaque white is distributed among different printing units of the printing machine. The method of the invention may be used both for a single opaque white printing unit and for multiple opaque white printing units. If there are multiple opaque white printing units, the application of opaque white needs to be distributed among the printing units of the printing machine that are intended for the application of opaque white.

Another preferred development of the method of the invention in this context is that to control the application of opaque white, the application of opaque white is measured at the fixed positions of the previous calibration and distributed to the contributing printing units in accordance with a preset distribution factor. The distribution factor needs to be defined to ensure the accurate distribution of the desired opaque white application to the respective contributing opaque white printing units.

A further preferred development of the method of the invention in this context is that before the process of closed-loop control of the process colors is started, the colors are preset by using a characteristic curve to which the preset distribution factor is applied. In order to be able to start closed-loop color control as close to the desired target values as possible and thus to minimize the number of unusable prints, the characteristic curve of the color presettings is important. The preset distribution factor is likewise to be applied to the characteristic curve of the color presettings. Logically, this is only the case when a process color is to be applied by multiple printing units.

An added preferred development of the method of the invention in this context is that the computer uses the data recorded by the inline measuring device to monitor the reaction of the coloration to the thickness of the ink layer and prevents any further ink layer thickness increase when a saturation threshold is reached. This is in particular necessary due to the fact that particularly for light opaque colors such as opaque white, mere colorimetric control is problematic because the color values for opaque white, for instance, do no longer change once a specific ink layer thickness is attained. To put it more simply, white cannot become whiter than it already is. However, since the ink layer thickness is subject to specific limits, the reaction of the attained coloration to the thickness of the applied ink layer needs to be monitored in a corresponding way.

A concomitant preferred development of the method of the invention in this context is that after closed-loop color control has been set up, it is switched to individual closed-loop control of the printing units for the production run by setting the average color location of the respective printing units as the new target color location, while the computer continues to monitor the overprinting of process colors and opaque white and, if deviations become too great, automatically switches back to closed-loop overprinting control as when closed-loop color control is set-up. Individual closed-loop control of the printing units, independently of the overprinting, is usually preferred for the production run. However, if problems become apparent during the monitoring of the overprinting of process colors and opaque white, and if deviations become too great, the system may automatically be switched back to closed-loop overprinting control like during the set-up process in accordance with the method of the invention.

Other features which are considered as characteristic for the invention are set forth in the appended claims. The invention as such as well as further developments of the invention that are advantageous in constructional and/or functional terms will be described in more detail below with reference to the associated drawings and based on at least one preferred exemplary embodiment.

Although the invention is illustrated and described herein as embodied in a method for inline opaque white control in printing machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
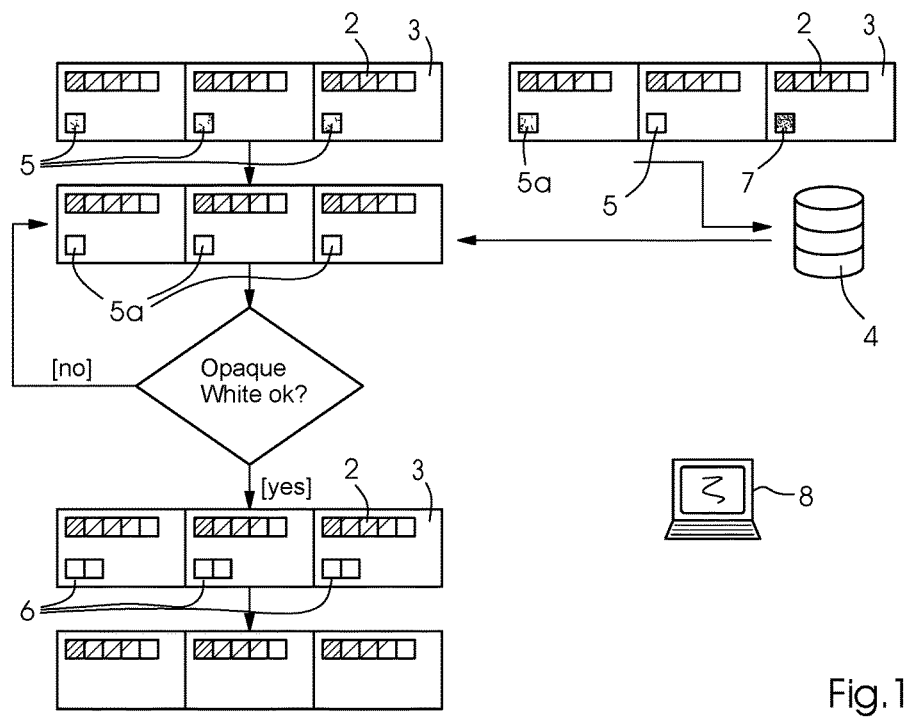
FIG. 1 is a flow chart of the three main stages of the entire method of the invention.

Referring now in detail to the figures of the drawings, in which mutually corresponding elements have the same reference symbols, and first, particularly, to FIG. 1 thereof, it is seen that a color measurement strip 2 is applied to an opaque white base layer 3. Locations 5 of a correction measurement, locations 5a of a correction measurement with low deviation and locations 7 of a correction measurement with high deviation are indicated on the opaque white base layer 3. Data concerning the locations 5, 5a and 7 are stored in a data storage device 4. A decision is made as to whether or not the opaque white is acceptable. Locations 6 of the color measurement and opaque white measurement are also indicated. The method is controlled by a computer 8.

As shown in FIG. 1, there are roughly three closed-loop opaque white control steps using the color measurement strips described above:

1. A calibration of the spectral measuring heads which are used:

Below the color measurement strip, a correction measurement is taken at a respective fixed position for every zone and the spectra are saved for later calculations.

2. Initial closed-loop control of an equally distributed opaque white base for the color measurement strip:

In this process, the opaque white is measured at the positions of the previous calibration and distributed to the contributing units in accordance with a preset distribution scheme. If the deviation stays below an average deviation, for instance dE=6 for Lab values, and if there is zonal homogeneity, the system automatically moves on to color measurements in the print control strip.

3. Color and opaque white measurement in the color measurement strip:

Once a complete correction measurement on opaque white has been taken, the color measurement strip may be measured. At this point, closed-loop color and opaque white control are possible at the same time.

Figure 2:
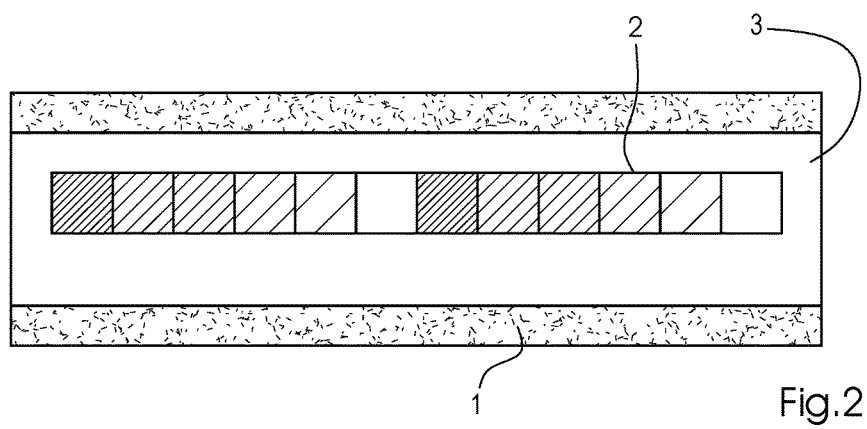
FIG. 2 is a diagrammatic, top-plan view illustrating the configuratioin of opaque white and color control strips.

FIG. 2 illustrates an example of a color measurement strip in accordance with the method of the invention. An opaque white base layer 3 is applied to an aluminum lamination printing substrate 1 and the color control strip 2 to be used in closed-loop opaque white and color control is then printed on top of the base layer 3.

Figure 3:
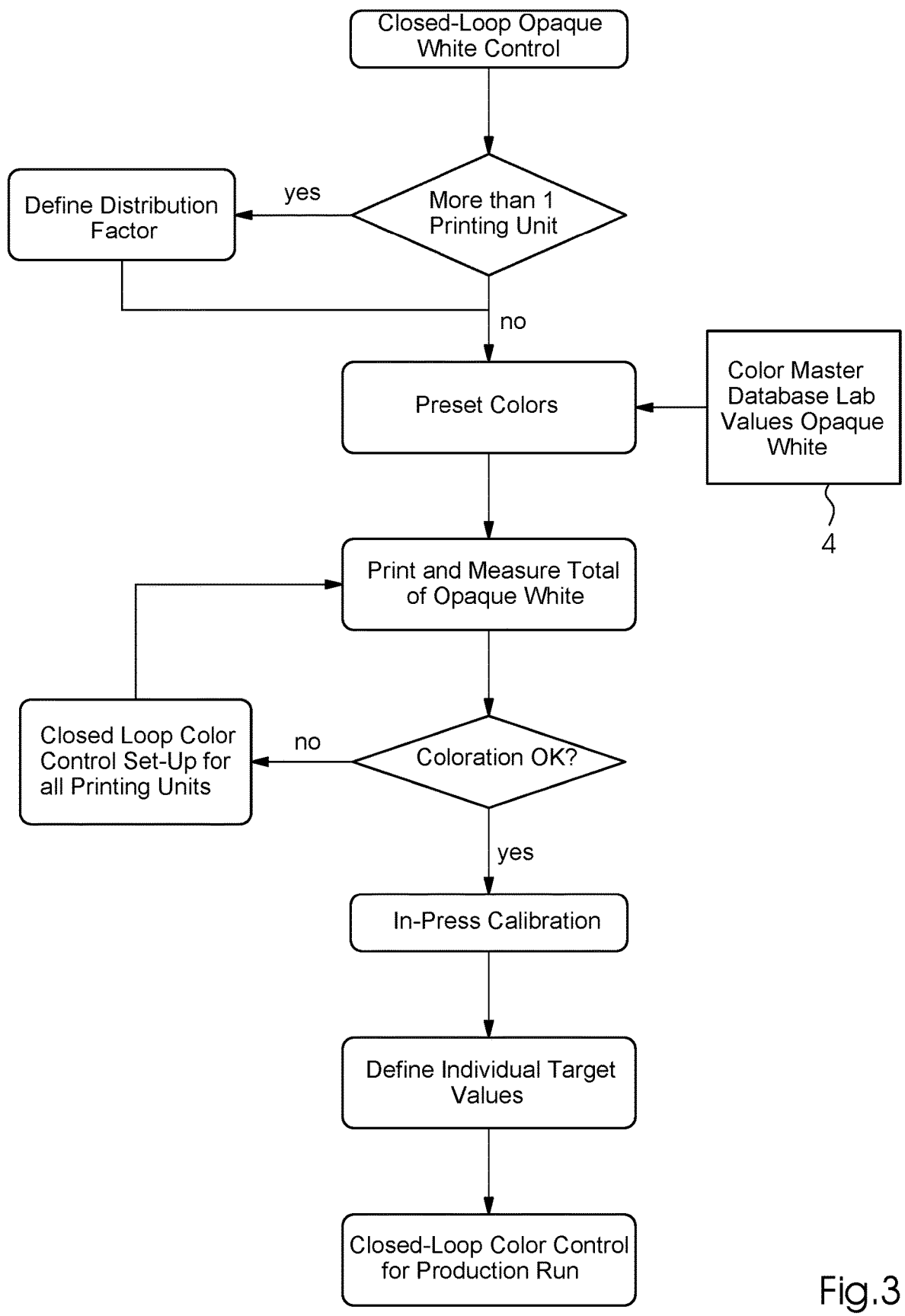
FIG. 3 is a detailed flow chart of the method of the invention including all parameters.

FIG. 3 is a flow chart of the individual steps of a preferred embodiment of the method of the invention. In the first step, the computer, which is preferably the control unit of the printing machine which is used, defines the distribution factor for closed-loop opaque white control; this factor is itself predefined as a function of the number of printing units which are used to apply the opaque white. Then, the computer defines how to distribute the layer thickness ratio between the individual opaque white printing units as a function of the distribution factor. If there are two opaque white units, for instance, a preferred setting is 55% (1st printing unit) and 45% (2nd printing unit). Then the colors are preset. Every printing unit then uses its allocated and taught-in characteristic color presetting curve for the respective set of colors. If multiple printing units are used for a set of colors, the distribution factor needs to be applied in a corresponding way. The calculation is as follows: characteristic curve in accordance with set of colors*distribution factor. In this way, the closed-loop color control is set up accordingly by forwarding the color deviation percentage to all contributing printing units. In the next step, individual target values are defined for opaque white and the colors to prepare closed-loop control for the production run.

If the total coloration is ok, the average color location of the individual printing units is taken as the new target color location for the individual printing units. An advantage of this process over closed-loop control for overprinting, which is used during set-up, is that the layer thicknesses are thinner and easier to control. Then closed-loop color control continues accordingly during the production run. While this closed-loop control of the individual printing units is done, overprinting continues to be monitored so if deviations become too great, a switch to closed-loop overprinting control as during set-up is made. This switch can be made in an automated way or after a prompt for confirmation.

Another aspect is to check the direction of the adjustment. This has the following background: Opaque colors reach color saturation relatively quickly, i.e. any further ink layer thickness increase will not change coloration. Therefore, the sensitivity, i.e. the reaction of the coloration to the thickness of the ink layer, needs to be monitored at all times. If the saturation threshold is reached, the ink layer thickness is no longer increased. If this is the case, the operator should be alerted to that fact. In addition, the adjustment steps towards more ink ought to be smaller than towards less ink. This prevents opaque white from being increased unnecessarily.

In summary, the method of the invention has the following advantages over the prior art:

1. Closed-loop control of the total color impression, i.e. of the overprinting of all opaque white printing units which are used, is possible.
2. The closed-loop control parameters are automatically distributed to all contributing printing units.
3. It is possible for the operator to input the distribution of the opaque white application.
4. The individual opaque white target color values are determined automatically.
5. The closed-loop control parameters are a function of the adjustment direction/are trained.
6. Inline devices may be calibrated.

The following is a summary list of reference numerals and the corresponding structure used in the above description of the invention:

1 printing substrate
2 color measurement strip
3 opaque white
4 data storage
5 location of the correction mesaurement
5a location of the correction measurement with low deviation
6 location of the color measurement and opaque white measurement
7 location of the correction measurement with high deviation
8 computer

The invention claimed is:

1. A method for closed-loop color control in printing machines, the method comprising:
   initially coating an uncoated printing substrate with opaque white to set up closed-loop color control in a course of a print job;
   subsequently applying both process colors and color measurement strips onto the opaque white;
   recording the opaque white and the color measurement strips by using an inline measuring device;
   using a computer to perform closed-loop color control for process colors and opaque white based on data recorded by the inline measuring device;
   initially calibrating the inline measuring device at a fixed position of the uncoated printing substrate and then setting-up application of the opaque white; and
   implementing closed-loop control of both the opaque white and the process colors when a deviation stays below a maximum deviation, by using the computer to take measurements in the color control strip.

2. The method according to claim 1, which further comprises providing the fixed position as a position immediately next to the color measurement strip.

3. The method according to claim 1, which further comprises providing a spectral measuring head as the inline measuring device measuring both the opaque white and the measurement strips in Lab values.

4. The method according to claim 1, which further comprises taking a correction measurement at a fixed position for the calibration of the inline measuring device and saving spectra for later calculations.

5. The method according to claim 4, which further comprises using multiple printing units for the application of the opaque white, and distributing the application of the opaque white among the multiple printing units of the printing machine.

6. The method according to claim 5, which further comprises controlling the application of the opaque white by measuring the application of the opaque white at the fixed positions of a previous calibration and distributing the application of the opaque white to the multiple printing units in accordance with a preset distribution factor.

7. The method according to claim 6, which further comprises before starting the closed-loop control of the process colors, presetting the colors by using a characteristic curve to which the preset distribution factor is applied.

8. The method according to claim 1, which further comprises using the computer to utilize the data recorded by the inline measuring device to monitor a reaction of a coloration to a thickness of an ink layer and prevent any further ink layer thickness increase when a saturation threshold is reached.

9. The method according to claim 1, which further comprises after setting up a closed-loop color overprinting control, switching to individual closed-loop color control of printing units for a production run by setting an average color location of respective printing units as a new target color location, while the computer continues to monitor overprinting of process colors and opaque white and, if deviations become too great, automatically switching back to the closed-loop color overprinting control as when the closed-loop color overprinting control is set-up.

\* \* \* \* \*